June 17, 1958     J. T. HELLYER     2,839,262
LIQUID HEATER AND DISPENSER WITH WEIGHER
Filed July 18, 1955     4 Sheets-Sheet 1

INVENTOR:
John T. Hellyer,
BY Bair, Freeman & Molinare
ATTORNEYS.

June 17, 1958  J. T. HELLYER  2,839,262
LIQUID HEATER AND DISPENSER WITH WEIGHER
Filed July 18, 1955  4 Sheets-Sheet 4
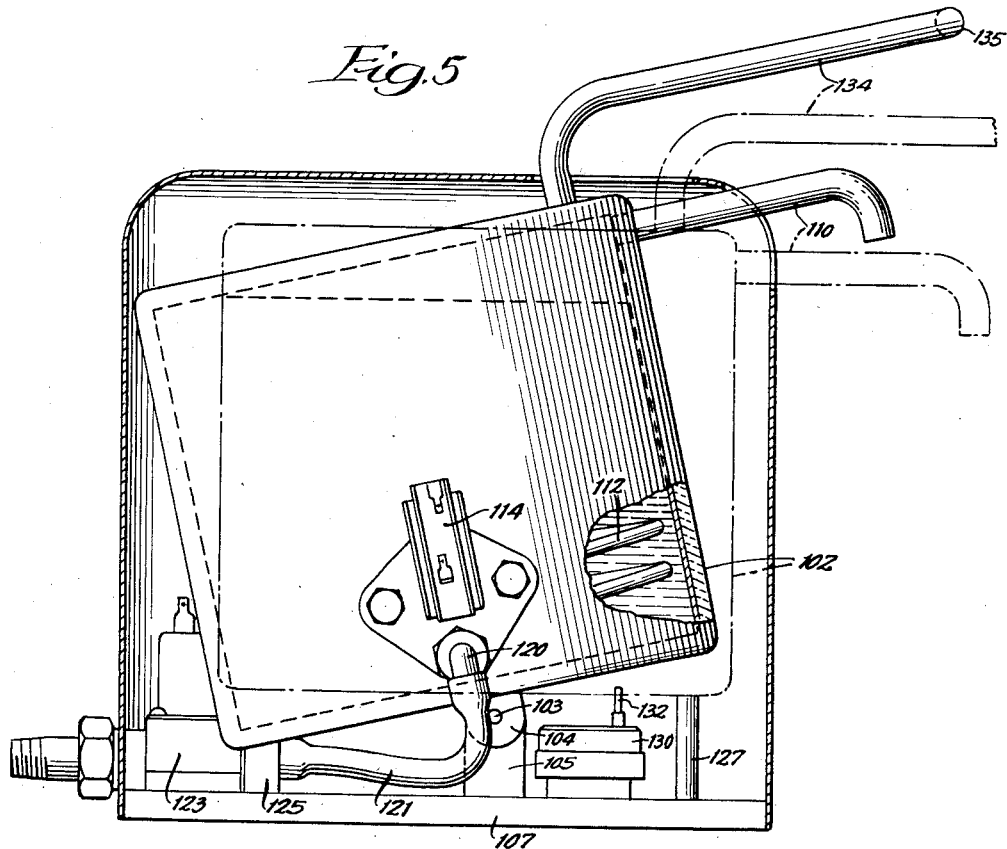
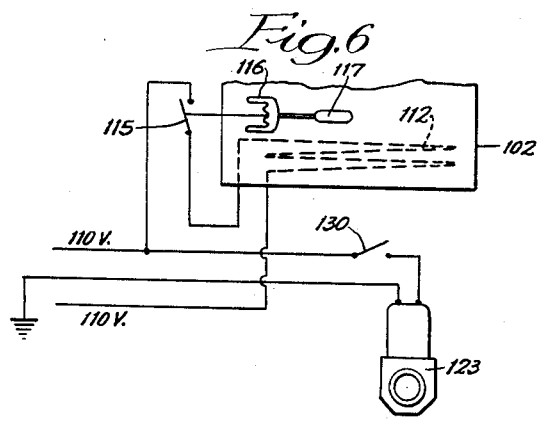
INVENTOR:
John T. Hellyer,
BY
Baer, Freeman & Molinare
ATTORNEYS.

United States Patent Office 2,839,262
Patented June 17, 1958

2,839,262

LIQUID HEATER AND DISPENSER WITH WEIGHER

John T. Hellyer, Batavia, Ill., assignor of one-half to Robert S. Strom, Wheaton, Ill.

Application July 18, 1955, Serial No. 522,451

16 Claims. (Cl. 249—63)

This invention relates to a tank type liquid dispenser, such as by way of example and not limitation, a hot water tank and heater assembly. Such dispensers may be utilized for dispensing various liquids, and are especially suitable for use in restaurants, lunch counters and in commercial establishments for supplying hot water for making various beverages, such as, coffee, tea, hot chocolate, soup, bouillon, etc.

When the dispenser is employed for discharging hot water, such as used for making instant coffee, brewed coffee, tea, hot chocolate and the like, the temperature of the water preferably should be in the range of 205° F. or higher, in order to efficiently produce beverage of a highly satisfactory flavor and taste. When water of lower temperature is used the quality of flavor and taste of the beverage is greatly reduced. Hot water heaters as currently available for brewing beverages and the like in restaurants, etc., are of various types. One widely used type of hot water heater employs a stationry tank vented to atmosphere and having an open spout. Such hot water heaters are not constructed to provide for expansion of the water incident to heating, and hence, after each cycle of operation (i. e., withdrawal of a quantity of hot water), the water in the tank is brought up to a predetermined temperature and the residual heat from the heating element tends to keep the waer boiling and expanding, resulting in a substantial amount of dripping of hot water after each withdrawal from the tank. Such a condition is highly objectionable as well as somewhat hazardous. Moreover, because there is no provision in such water heaters for accommodating expansion of the hot water, and due to the dripping of water from the tank incident to use, it is not always possible to continuously maintain the water in the tank at a desired, predetermined high temperature.

One of the objects of the present invention is to provide a novel form of dispenser of the character indicated, having a tiltably mounted tank, provided with a discharge spout and a connection to a source of liquid supply together with means for controlling the liquid supply incident to tilting movement of the tank.

Another object is to provide a novel hot water heater of the character indicated having a tiltably mounted tank and a continuously open discharge spout located a short distance below the top of the tank to provide a vented chamber in the upper portion of the tank for accommodating expansion of the heated water in the tank.

A further object is to provide a novel hot water heater of the character indicated having a tiltably mounted tank and a continuously open discharge spout connected to the upper portion of the tank, a water supply conduit operably connected to the tank and valve means connected in the conduit, together with means responsive to tilting movement of the tank for actuating the valve means.

Still another object of this invention is to provide a novel hot water heater of the character indicated having a tiltably mounted tank provided with a constantly open discharge spout for discharging hot water when the tank is tilted to one position, and means for latching the tank at such a tilted position, together with a scale mechanism, including a receptacle receiving platform adapted to be moved when a predetermined quantity of water is discharged into the receptacle, for releasing the latch means and causing the tank to tilt to another position of adjustment for discontinuing the discharge of water from the spout.

Still another object of this invention is to provide a novel hot water heater of the character indicated which is constructed and arranged for automatically discharging a measured quantity of hot water.

It is also an object of the present invention to provide a novel hot water heater of the character indicated which eliminates all dripping of hot water incident to the expansion of hot water while it is being heated in the tank.

It is still another object of this invention to provide a novel hot water heater of the character indicated which is simple in construction, economical to manufacture, safe to use, and which permits obtaining a continuous supply of hot water at a substantially constant predetermined temperature.

Other objects and advantages of this invention will be apparent from the following description, taken in connection with the accompanying drawings, in which:

Figure 5 is a side elevational view of a manually operable type of hot water heater embodying the present invention.

Figure 6 is a wiring diagram of the electrical circuit for the hot water heater shown in Figure 5.

*Automatic dispenser*

Figure 1:
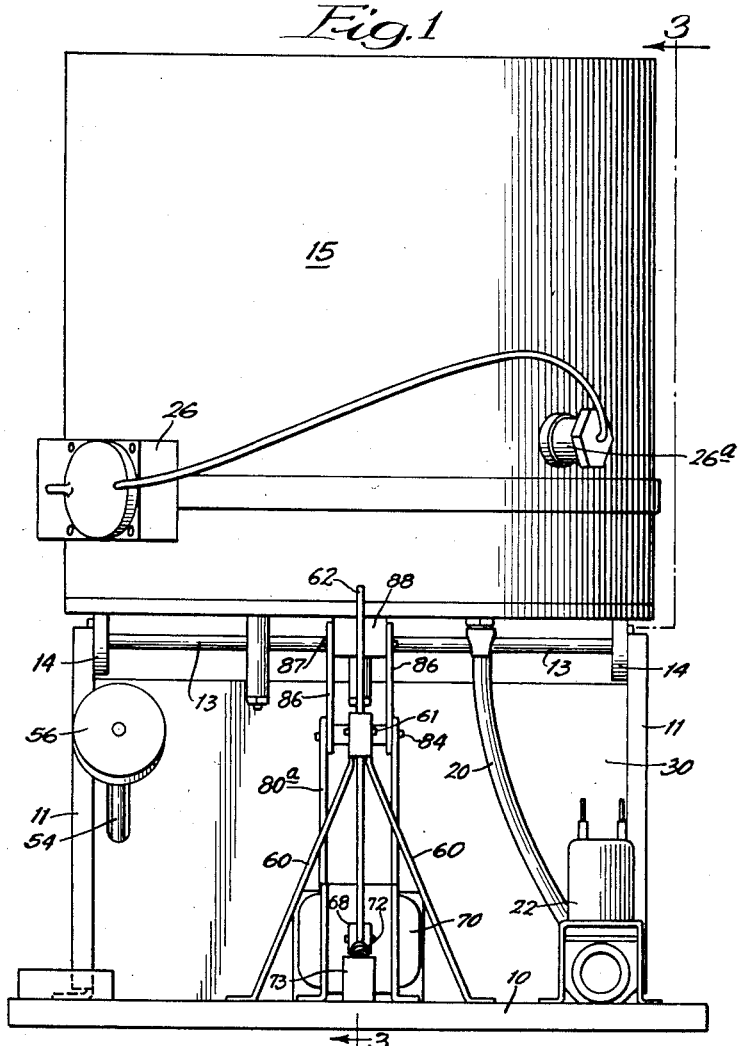
Figure 1 is a rear elevational view of the novel hot water heater embodying the present invention, including automatic mechanism for controlling the discharge of a predetermined quantity of hot water.

The hot water heater represented in Figures 1 to 4 inclusive of the drawings is of the automatic type and includes a main support or base 10, on which is mounted in space-apart relation, a pair of upright standards 11. The upper end of each of the standards is provided with an aperture 12, serving as a bearing for the reception therein of a transversely extending rock shaft 13. Mounted on the shaft, adjacent each standard, is a lug 14, depending from the underside of a hot water storage tank 15, and by virtue of which said tank is supported on the standards 11, as may be clearly seen in Figures 1 and 3 of the drawing. The axis of the rock shaft is located a substantial distance forwardly of the center of gravity of the tank 15, so that said tank normally tends to tilt rearwardly and assume a position as indicated in the dot-and-dash outline in Figure 3 of the drawing.

The tank 15 may be of various sizes and shapes, and as herein shown is circular in cross section. The tank comprises an inner metallic shell 16, totally surrounded by a wall of suitable heat insulating material as indicated at 17. Connected into the forward wall portion of the tank, adjacent its upper end, is a liquid discharging spout 18, which also serves to provide continuous atmospheric venting for the upper portion of the tank. A suitable water conduit 20, is connected at one end to bottom portion of the tank and the opposite end is connected to a solenoid valve 22, and the latter is adapted to be connected by a suitable conduit, not shown, to a source of cold water supply. It is to be understood that the connection of the conduit 20 into the bottom of the tank is such as to permit introduction of water into the tank approximately parallel to the bottom of said tank, so that the cold water as it is introduced into the tank tends to remain at the bottom of the tank and assume a strata formation with respect to water in the tank that has been previously heated.

Mounted in the bottom portion of the tank is an electrical heating element 24, which is preferably of the type that will produce a relatively high rate of heat exchange for rapidly increasing the temperature of the water in the tank to a predetermined temperature. The water in the tank preferably should be heated to 205° F. or higher when the hot water is to be used for making certain beverages, such as, coffee, tea and the like. For controlling the temperature of the water in the tank, I provide a suitable thermostat of conventional form as indicated generally at 26, and 26a, comprising a switch as indicated at 27, together with a pressure responsive diaphragm as indicated at 28, and a temperature sensitive bulb as indicated at 29, positioned in the tank.

Figure 3:
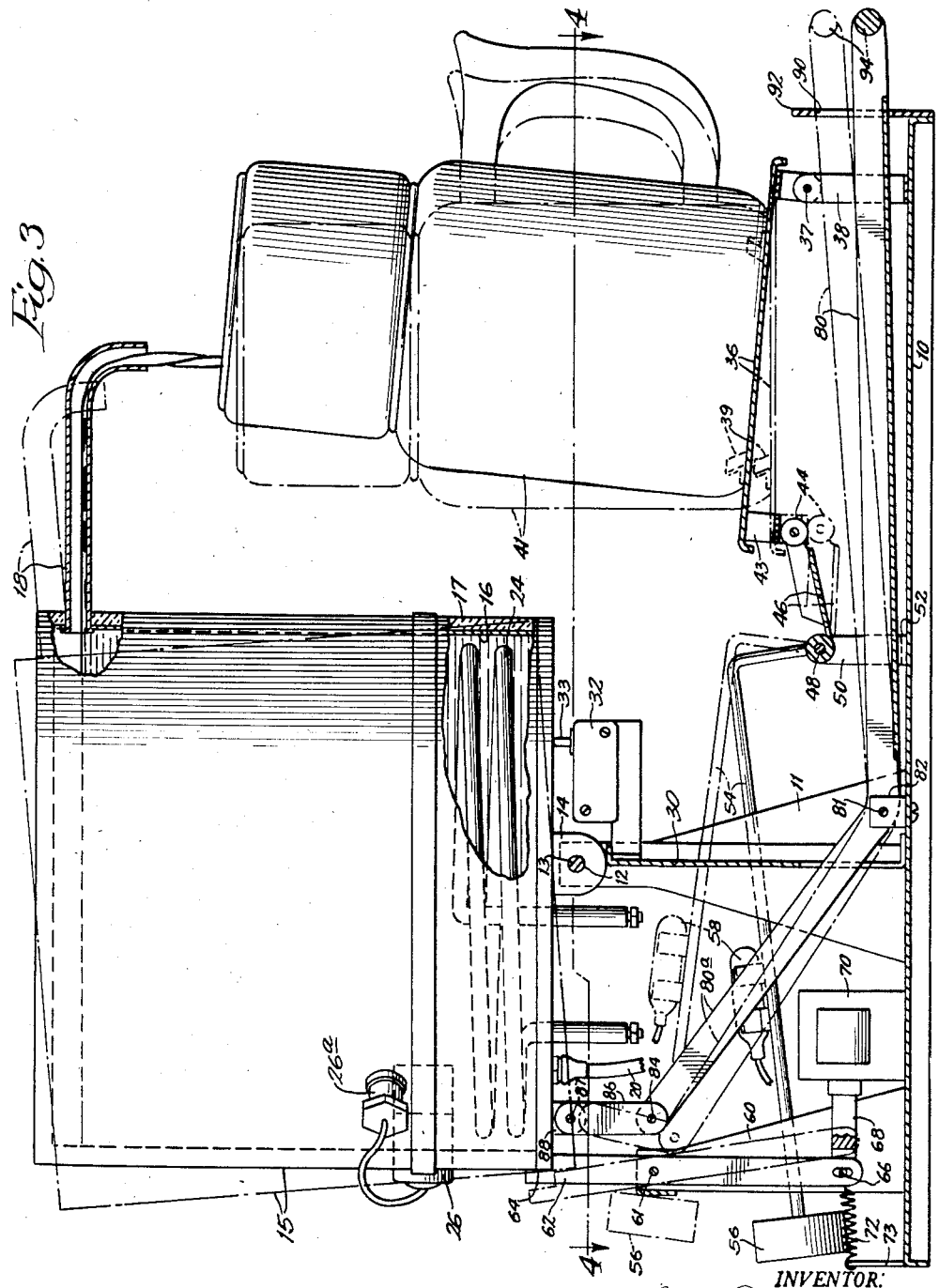
Figure 3 is a side view, part in section and part in elevation, taken substantially as indicated at line 3—3 on Figure 1.
Figure 4:
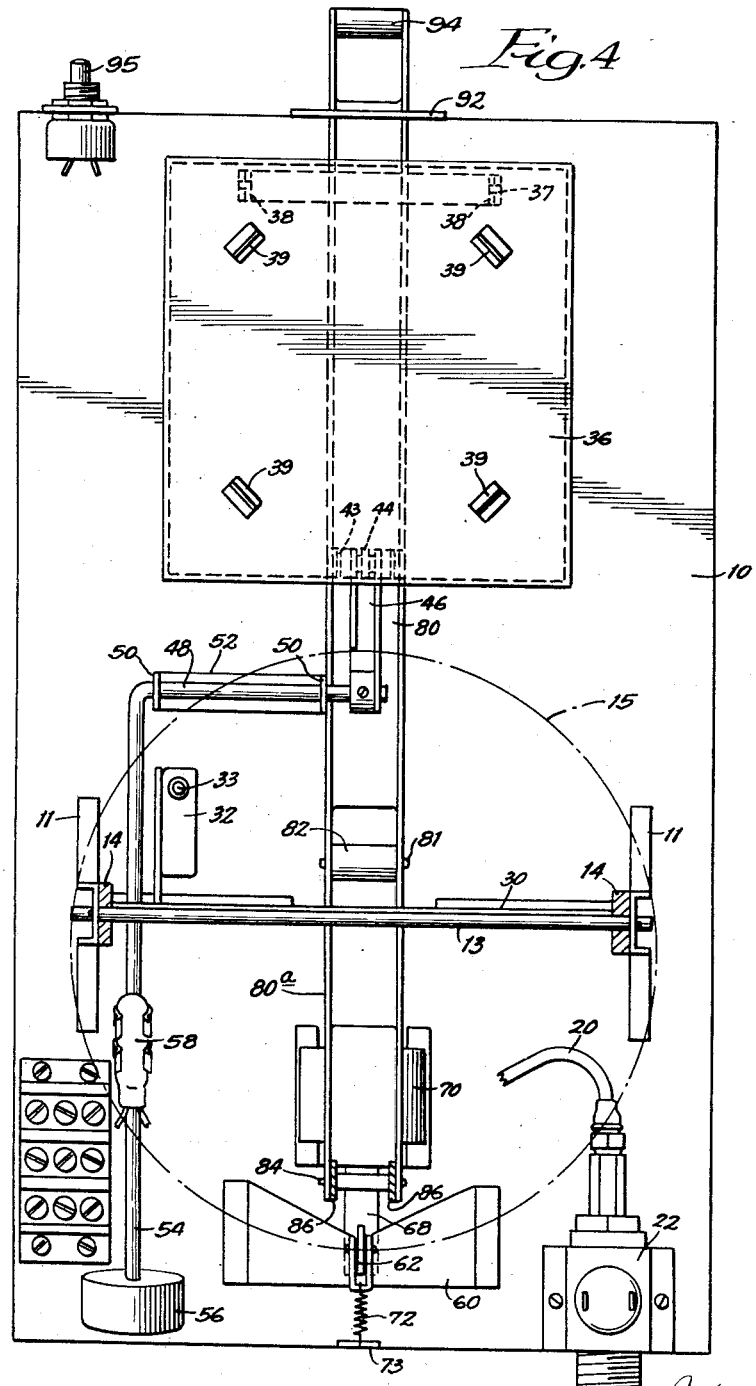
Figure 4 is a transverse sectional view through the heater, taken substantially as indicated at line 4—4 on Figure 3.

Mounted on an upright bracket 30, carried on the base member 10, is a switch 32, having a spring pressed plunger 33, positioned to be engaged by the under side of the tank 15, when it is tilted to an upright position, as clearly seen in Figure 3 of the drawings. Said switch 32 is normally open when the tank is in a rearwardly tilted position, as seen in dot-and-dash outline in Figure 3 of the drawings.

A suitable scale mechanism is provided in the construction illustrated in Figures 1 to 4 of the drawings, by virtue of which operation of the tank for dispensing a measured quantity of hot water therefrom is automatically attained. The scale mechanism comprises a receptacle receiving platform 36, pivotally mounted at 37, at its forward end, on a pair of upstanding legs 38, of a U-shaped mounting bracket, secured to the main support 10. The upper surface of the platform is provided with a plurality of upstanding lugs 39, for centering a suitable receptacle or decanter on the platform. As shown in Figure 3 of the drawings, is a two-piece combination receptacle, indicated at 41, in the nature of a drip type coffee maker, positioned on the platform 36. As well understood, the upper receptacle of said coffee maker contains ground coffee and when hot water is introduced therein the water filters through the ground coffee down into the lower receptacle. Coffee brewed in this manner is usually referred to as drip type coffee.

The rear end of the platform 36 is formed with a depending U-shaped bracket 43, supported on a roller 44, carried on the forward end of an operating arm 46, which in turn is rigidly connected at its rear on a rock shaft 48, journaled in upright legs 50 of a U-shaped mounting bracket 52 mounted on the main support 10. Said rock shaft continues into a rearwardly extending weight arm as indicated at 54, on the outer end portion of which is mounted an adjustable weight 56. The weight 56 is positioned along the arm 54 so as to counterbalance the weight of the receptacle on the platform, together with the amount of water to be introduced into the receptacle. The platform and weight arm initially assume the position shown in full lines in Figure 3 of the drawings, and when the receptacle on the platform has been filled with a predetermined quantity of water, it actuates the weighing or scale mechanism by depressing the platform and through the linkage comprising the arm 46, rock shaft 48, raises the arm 54 and its weight 56 to the dot-and-dash outline position, as seen in Figure 3 of the drawings. It is by virtue of such action that dispensing of water from the tank into the receptacle is instantly discontinued as will be presently described. Mounted on the weight rod 54 is a mercury switch 58 which constitutes a part of the control circuit. Said switch is normally open when the weight rod is in the full line position seen in Figure 3 of the drawings.

Mounted at the rear end of the main support 10 is a suitable latching mechanism for controlling the position of adjustment of the tank 15. This latching mechanism comprises an upright support composed of a pair of upwardly converging arms as indicated at 60, between the upper ends of which is pivotally mounted at 61, a latch bar 62. The upper end of the latch bar is cut out as indicated at 64, for embracing the lower rear corner of the tank 15, when the tank is moved to the upright position seen in full lines in Figure 3. The lower end of the latch bar is pivotally connected, as indicated at 66, to the outer end of a plunger element 68 of a solenoid 70. A spring 72 is connected at one end to an upstanding lug 73, on the rear end of the main support, and its opposite end is connected to the free end of the plunger of the solenoid so as to normally tend to withdraw the plunger of the solenoid and simultaneously urge the latch bar 62 to a full line position as seen in Figure 3 of the drawings.

The tank is adapted to be manually moved from its rearwardly tilted position, as represented in dot-and-dash outline, to an upright full line position as seen in Figure 3 of the drawing. For this purpose, I provide an elongated lever indicated at 80, pivotally mounted at 81 to a bearing block 82 secured to the main support 10. Said lever arm 80 continues rearwardly in an upwardly inclined direction as indicated at 80a, and is pivotally connected at its upper end, as indicated at 84, to a pair of spaced apart depending links 86, the upper ends of which are pivotally connected at 87 to a bearing block 88, secured to the under side of the tank 15.

When the latch bar 62 is disengaged by the operation of the solenoid 70, the tank 15 tilts rearwardly to the dot-and-dash line position seen in Figure 3 and the linkage is correspondingly actuated, causing the forward end of the lever 80 to be arrested against the edge 90 of a surrounding yoke member 92, secured to the forward end of the main support 10. The outer end of the lever is provided with a finger engaging member 94, by virtue of which the linkage is initially, manually actuated for moving the tank from a rearwardly tilted position to an upright position for dispensing of hot water.

*Operation*

Figure 2:
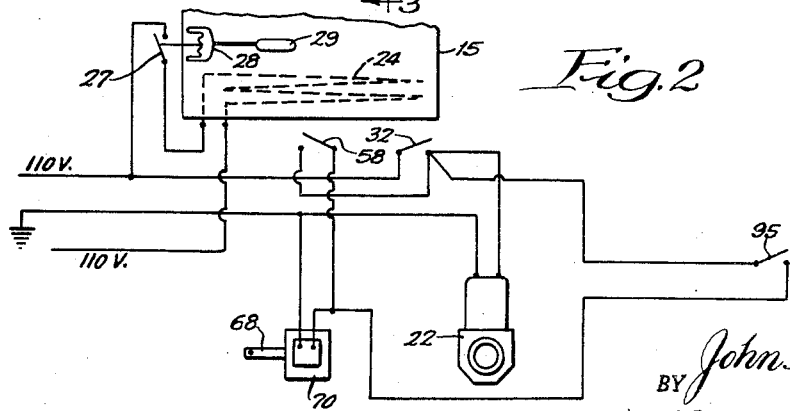
Figure 2 is a wiring diagram of the electrical circuit for the hot water heater embodying the present invention.

Normally, when the tank 15 is filled with water and the heating element 24 is connected in the electrical circuit as illustrated in Figure 2 of the drawing, the thermostat serves to control the heating element 24 so as to maintain the water in the tank at a predetermined temperature. In the normal inoperative non-dispensing position, the tank assumes a rearwardly tilted position, as seen in dot-and-dash outline in Figure 3, with the level of the water disposed a substantial distance below the inlet end of the spout 18. After a decanter or receptacle is placed on the platform 36, the lever 80 is depressed, by engaging the finger piece 94, which through the linkage comprising the levers 80, 80a and links 86 elevates the tank to the full line position seen in Figure 3 of the drawings, and as a result of such movement the tank closes the switch 32, completing the electric circuit to the solenoid valve 22, causing cold water to be introduced into the bottom of the tank, and simultaneously the hot water in the upper portion of the tank is discharged through the spout 18 into the receptacle or decanter 41. When the tank has been moved to its upright position, the latch bar 62, under influence of the spring 72, moves into operative blocking position for securing the tank in its upright position. After the receptacle or decanter has been filled with a predetermined quantity of hot water, as determined by the setting of the weight 56 on the weight arm 54, the scale mechanism is actuated by the downward movement of the platform 36, caused by the weight of the decanter or receptacle together with the weight of the predetermined quantity of water introduced therein as seen in full lines in Figure 3, for raising the weight arm, so that said scale mechanism assumes a position as seen in dot-and-dash outline in Figure 3. Such movement of the arm 54 closes the mercury switch 58, which closes the electric circuit to energize the solenoid 70, causing retraction of the solenoid plunger 68, and thereby moving the latch bar 62 to the dot-and-dash position shown in Figure 3 of the drawings, so as to permit the tank, due to its off center pivot support, to tilt rearwardly, and simultaneously therewith open the switch 32 for closing the solenoid valve 22, controlling the water supply to the tank. Opening of the switch 32 breaks the circuit through switch 58, thereby de-energizing the latching solenoid 70, and permitting the latch bar to be spring biased, with its upper end engaging against the rear wall of the tank.

When the receptacle or decanter filled with hot water is removed from the platform 36, said platform and weight rod again assume the position shown in full lines in Figure 3 of the drawings, and all circuits, except the heater circuit, remain broken.

In order that the automatic dispenser herein described may be conveniently used for dispensing unmeasured quantities of hot water, such as in a cup or other receptacle, I provided a push button switch 95, connected in a shunt electrical circuit for controlling operation of the latching solenoid 70. For such use, the cup or receptacle is held in proper position beneath the discharge end of the spout 18, and the main linkage for moving the tank is actuated by depressing the finger piece 94 to move the tank 15 from its rearwardly tilted position to an upright position at which time the switch 32 is closed to complete an electrical circuit to the solenoid valve 22 to permit introduction of cold water into the bottom of the tank, as above described, and by virtue of which hot water is then discharged through the spout 18 into the cup or receptacle. Such movement of the tank 15 from its tilted position to an upright position causes the latching bar 62 to move into operative blocking engagement with the bottom of the tank, as above described to maintain the tank in an upright position. After a desired amount of hot water has been dispensed from the tank, the push button switch 95 is closed, completing a shunt circuit to the latching solenoid 70, causing the solenoid to be energized and effecting withdrawal of the plunger 68 for moving the latch bar 62 out of operative latching position and thereby permitting the tank, by its offset support, to again tilt rearwardly to the tilted position shown in dot-and-dash outline in Figure 3, and simultaneously opening the switch 32, which breaks the electrical circuit to the solenoid valve 22, supplying water to the tank, and to the latching solenoid 70, so that the latch bar is permitted to be spring pressed against the lower rear side wall of the tank 15.

By virtue of the novel tiltable mounting for the tank 15, it will be observed that when the apparatus is not functioning for dispensing of the hot water, the supply of hot water in the tank may be maintained at a predetermined temperature. The construction is such that even though the volume of hot water in the tank, in process of heating, expands, such as occurs after dispensing of a quantity of hot water, such expansion is readily accommodated due to the vented air chamber provided in the upper portion of the tank, by virtue of the location of the continuously open discharge spout 18. Furthermore, by virtue of the provision of the continuously open discharge spout, all possibility of dripping incident to either expansion or dispensing of hot water is totally eliminated.

Manual dispenser

Figures 5 and 6 of the drawings disclose a manually operable type of dispenser. In this construction a tank indicated at 102 is pivotally supported on a transverse axis, on a rock shaft 103, located forwardly of the normal center of the gravity of the tank, in a manner similar to the construction disclosed in Figures 1 to 4 in the drawings. Depending from the underside of the tank is a pair of transversely spaced-apart lugs 104, mounted on the rock shaft 103, and the rock shaft being supported by a pair of transversely spaced-apart standards 105, extending upwardly from a main support or base 107. The tank is of the same general construction described above in connection with the structure shown in Figures 1 and 4 of the drawings, and includes a continuously open discharge spout 110, connected into the upper front wall portion of the tank. The water in the tank is heated by a suitable electrical heating element 112, which is connected in an electrical circuit including a suitable thermostat 114, comprising a switch 115, a pressure responsive diaphragm 116, and a temperature sensitive bulb 117. By virtue of the thermostat the water in the tank 102 is maintained at a predetermined temperature.

Cold water is supplied into the bottom of the tank through a fitting 120, connected by a flexible hose 121, to a solenoid valve 123, which is adapted to be connected to a source of cold water supply. The tank 102 is arrested at a rearwardly tilted position, by a suitable stop 125, and is arrested at an upright dispensing position by a suitable stop 127. These stops may be formed of any suitable material and may include a resilient portion for directly contacting the underside of the tank. Mounted below the forward end of the tank is a switch 130, having a spring pressed plunger 132, positioned to be engaged by the tank when it is rocked forwardly to an upright position. The switch 130 is connected in an electrical circuit in series with the solenoid valve 123, as seen in Figure 6. A suitable handle, as indicated at 134, is connected to the tank and includes a forwardly extending portion terminating in a suitable hand grasp 135.

Operation

The tank may be rocked to and from an upright discharging position, by manual engagement of the hand grasp 135. It will be understood, of course, that in the process of discharging hot water from the tank the handle will be drawn forwardly and downwardly to position the tank uprightly to discharge hot water through the spout 110. When the desired amount of hot water has been withdrawn from the tank, the handle 135 is released and the tank will rock rearwardly again and assume the full line position as seen in Figure 5 of the drawings.

When the tank 102 is tilted uprightly to a water discharging position, it effects closure of the switch 130, for energizing the solenoid valve 123, permitting cold water to be introduced into the bottom of the tank, and simultaneously causing hot water to be discharged through the spout 110. When the tank 102 is moved to a rearwardly tilted position, the switch 130 is opened, breaking the electrical circuit to the solenoid valve, and thereby discontinuing supplying of cold water into the tank.

The manually operable hot water dispenser is especially suitable for use in restaurants, lunch counters and the like where it is desired to withdraw intermittently small quantities of hot water, such as for making a cup of coffee, tea, hot chocolate, soup, bouillon and the like. It is also adaptable for use in filling decanters or other types of receptacles with hot water, such as for making a substantial quantity of brewed coffee or other beverages and the like in a conventional manner.

It will be manifested that this particular embodiment of my invention also possesses the same advantages of my automatic dispenser, insofar, as it provides an air chamber, into which the hot water may expand without danger, and which totally eliminates dripping of hot water.

Although, I have herein shown and described certain preferred embodiments of my invention, manifestly it is capable of modification and rearrangement without departing from the spirit and scope thereof. I do not, therefore, wish to be understood as limiting this invention to the precise embodiments herein disclosed, except as I may be so limited by the appended claims.

What I claim is:

1. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, and means for opening said valve means to admit liquid to the tank in direct response to forward tilting of said tank incident to discharging liquid through said spout.

2. A liquid dispenser comprising a support, a tank adapted to contain liquid, pivotally mounted on a transverse, horizontal axis on said support and normally biased to tilt rearwardly about said axis, a continuously open discharge spout, having an inlet end and an outlet end, connected in open communication with the upper portion of the tank, with the inlet end positioned above the normal liquid level when the tank is in a rearwardly tilted position, means for limiting rearward tilting movement of the tank, said tank being tiltable to a forward position for causing the inlet end of the spout to register with the liquid in the tank for discharging liquid through said spout, a liquid supply conduit operably connected to the tank, valve means for controlling liquid flow through said conduit, and means for opening said valve means to admit liquid to the tank in direct response to forward tilting movement of said tank incident to discharging liquid through said spout.

3. A liquid dispenser comprising a support, a tank, adapted to contain liquid, pivotally mounted on a transverse horizontal axis on said support, said pivot axis being located forwardly of the center of gravity of the tank, whereby said tank tends to normally tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, and means for opening said valve means to admit liquid to the tank in direct response to forward tilting of said tank incident to discharging liquid through said spout.

4. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, means for limiting forward tilting of the tank, said tank being tiltable to a forward position for discharging liquid through said spout, a liquid supply conduit operably connected to the tank, valve means for controlling liquid flow through said conduit, and means for opening said valve means to admit liquid to the tank in direct response to forward tilting of said tank incident to discharging liquid through said spout.

5. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, means for heating the liquid in the tank, means for controlling said heating means for maintaining the liquid in the tank at a predetermined temperature, said tank being tiltable to a forward position for discharging liquid through said spout, a liquid supply conduit operably connected to the tank, valve means for controlling liquid flow through said conduit, and means for opening said valve means to admit liquid to the tank in direct response to forward tilting of said tank incident to discharging liquid through said spout.

6. A liquid dispenser comprising a support, a closed tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, means for heating the liquid in the tank, means for controlling said heating means for maintaining the liquid in the tank at a predetermined temperature, said tank being tiltable to a forward position for discharging liquid through said spout, a liquid supply conduit operably connected to the tank, valve means for controlling liquid flow through said conduit, and means for opening said valve means to admit liquid to the tank in direct response to forward tilting of said tank incident to discharging liquid through said spout, said spout being located below the top of the tank to provide an air chamber, normally vented to atmosphere, for accommodating expansion of the heated liquid in the tank when the latter is at a rearwardly tilted position.

7. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, a solenoid valve for controlling liquid flow through the conduit, and a normally open electric switch connected in circuit with said solenoid valve, said switch being actuated in response to forward tilting movement of the tank, incident to discharging liquid through the spout, for actuating the solenoid valve to admit liquid to the tank.

8. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, means for heating the liquid in the tank, thermostat means for controlling said heating means for maintaining the liquid in the tank at a predetermined temperature, said tank being tiltable to a forward position for discharging liquid through said spout, a liquid supply conduit operably connected to the tank, a solenoid valve for controlling liquid flow through the conduit, and a normally open electric switch connected in circuit with said solenoid valve, said switch being actuated in response to forward tilting movement of the tank, incident to discharging liquid through the spout, for actuating the solenoid valve to admit liquid to the tank.

9. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, and means for manually tilting the tank forwardly to liquid discharging position.

10. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, mean for tilting the tank forwardly to liquid discharging position, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, and means operable in response to actuation of said weighing mechanism for disengaging said locking means and permitting said tank to move to its rearwardly tilted position.

11. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, a solenoid operably connected to said locking means, and a normally open switch connected in an electrical circuit for said solenoid, said switch being movable to closed position, incident to actuation of the weighing mechanism, for energizing said solenoid and disengaging said locking means, whereby to permit said tank to move to its rearwardly tilted position.

12. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, means for heating the liquid in the tank, thermostat means for controlling said heating means, for maintaining the liquid in the tank at a predetermined temperature, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, and means operable in response to actuation of said weighing mechanism for disengaging said locking means and permitting said tank to move to its rearwardly tilted position.

13. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, a solenoid valve for controlling liquid flow in the conduit, a normally open switch connected in an electric circuit for said solenoid valve, said switch being actuated in response to forward tilting movement of the tank for actuating the solenoid valve to admit liquid to said tank, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, and means operable in response to actuation of said weighing mechanism for disengaging said locking means and permitting said tank to move to its rearwardly tilted position.

14. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, a solenoid valve for controlling liquid flow in the conduit, a normally open switch connected in an electric circuit for said solenoid valve, said switch being actuated in response to forward tilting movement of the tank for actuating the solenoid valve to admit liquid to said tank, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, a solenoid operably connected to said locking means, and a normally open switch connected in an electrical circuit for said solenoid, said switch being movable to closed position, incident to actuation of the weighing mechanism, for energizing said solenoid and disengaging said locking means, whereby to permit said tank to move to its rearwardly tilted position.

15. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, a solenoid operably connected to said locking means, a normally open switch connected in an electrical circuit for said solenoid, said switch being movable to closed position, incident to actuation of the weighing mechanism, for energizing said solenoid and disengaging said locking means, whereby to permit said tank to move to its rearwardly tilted position, a manually operable, normally open, switch connected in shunt relation to said solenoid.

16. A liquid dispenser comprising a support, a tank, adapted to contain liquid, pivotally mounted on a transverse horizontal axis on said support and normally biased to tilt rearwardly about said axis, a continuously open discharge spout connected in open communication with the upper portion of the tank, means for limiting rearward tilting movement of the tank, said tank being tiltable to a forward position for discharging liquid through said spout, a liquid supply conduit operably connected to the tank, valve means for controlling liquid flow through said conduit, means for opening said valve means to admit liquid to the tank in direct response to forward tilting of said tank incident to discharging liquid through said spout, means for tilting the tank forwardly to liquid discharging position, weighing mechanism including a receptacle receiving platform pivotally mounted on the support in a position for registration with the discharge end of the spout, said mechanism being actuatable in response to the discharge of a predetermined quantity of liquid into the receptacle, means operable, when said tank is tilted forwardly to liquid discharging position, for locking said tank in said position, a solenoid operably connected to said locking means, a normally open switch connected in an electrical circuit for said solenoid, said switch being movable to closed position, incident to actuation of the weighing mechanism, for energizing said solenoid and disengaging said locking means, whereby to permit said tank to move to its rearwardly tilted position, and spring means for urging said locking means into locking position.

References Cited in the file of this patent
UNITED STATES PATENTS

| | | |
|---|---|---|
| 579,252 | Besson | Mar. 23, 1897 |
| 1,351,284 | Cawsey | Aug. 31, 1920 |
| 1,978,558 | Van der Horst | Oct. 30, 1934 |
| 2,210,250 | Melville | Aug. 6, 1940 |
| 2,308,960 | Stevens | Jan. 19, 1943 |
| 2,413,622 | Harding | Dec. 31, 1946 |
| 2,561,134 | Peters | July 17, 1951 |
| 2,647,719 | Coates | Aug. 4, 1953 |